S. E. REID.
AIR FEED FOR MOTORS.
APPLICATION FILED JUNE 10, 1916.

1,230,781.

Patented June 19, 1917.

Witnesses

S. E. Reid  Inventor by   Attorneys

UNITED STATES PATENT OFFICE.

SAMUEL E. REID, OF TAHOKA, TEXAS.

AIR-FEED FOR MOTORS.

1,230,781. Specification of Letters Patent. Patented June 19, 1917.

Application filed June 10, 1916. Serial No. 102,939.

*To all whom it may concern:*

Be it known that I, SAMUEL E. REID, a citizen of the United States, residing at Tahoka, in the county of Lynn and State of Texas, have invented a new and useful Air-Feed for Motors, of which the following is a specification.

The object of the invention is to provide an attachment adapted to be applied to the power plants of automobiles of the Ford and similar types, whereby to provide a moistened air supplying means for the intake manifold with a view to economizing the expenditure of fuel.

With this and other objects in view, the invention consists in a certain construction, combination and relation of parts hereinafter fully explained, it being understood that changes in form, proportions and minor details may be made within the scope of the claim without departing from the spirit of the invention.

In the accompanying drawings:—

Figure 1:
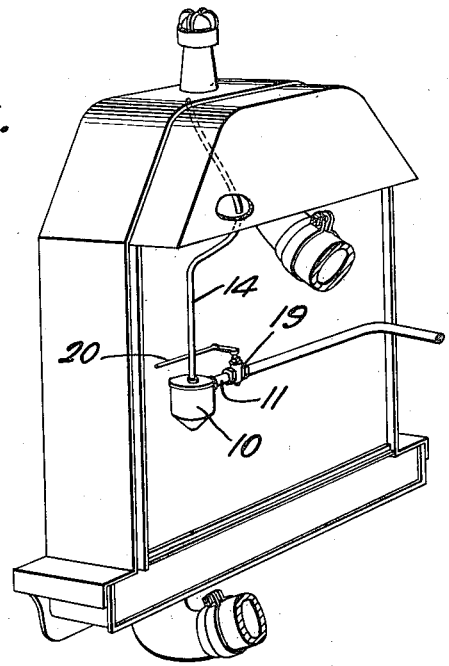
Figure 1 is a perspective view of a radiator of common type in connection with which the feed attachment is illustrated.
Figure 2:
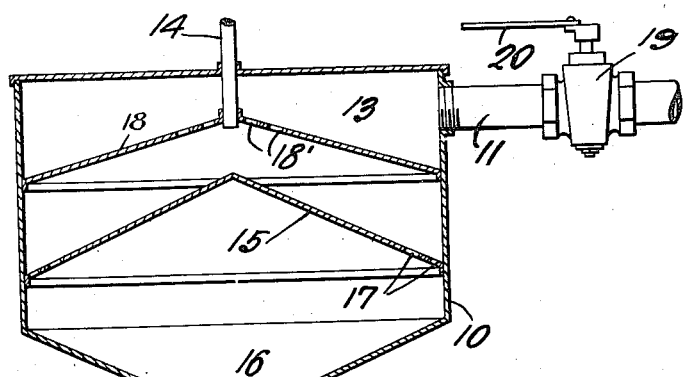
Fig. 2 is a sectional view of the feed apparatus.

In the embodiment of the invention illustrated in Figs. 1 and 2, a drum or casing 10 is connected by means of an air intake tube 11 with the engine manifold (not shown) or fuel pipe, between the carbureter and the cylinder, air being supplied to said tube through an inlet opening 12 in the hopper-shaped bottom of the drum. The air inlet tube is preferably attached to one side wall of the drum in communication with an upper air chamber 13 through which a tube 14 extends downwardly from the upper portion of the radiator or water circulating system, said tube 14 discharging the overflow water, steam and condensates upon a conical deflector 15. The conical deflector 15 is carried by the side walls of the drum, and the lower end of the tube 14 terminates above the apex of the deflector 15, there being a chamber 16 between said deflector and the hopper-shaped bottom of the drum, and the deflector 15 being provided with apertures 17 adjacent to its margin and the side walls of the drum through which the moisture can flow downwardly onto the bottom of the drum. A second conical deflector or partition 18 is secured to the side walls of the drum above the deflector or baffle 15, and provides the chamber 13 between the partition or baffle 18 and the top of the drum with which the tube or pipe 11 communicates. The tube 14 extends through the apex of the partition 18, and said partition is provided adjacent to its apex with apertures 18' for the upward flow of air therethrough.

Arranged in the air inlet tube 11 is a controlling valve 19, having connection by means of a rod 20 or the equivalent thereof with a suitable controlling member.

In operation, the water, steam and condensates which flow from the tube 14 drop onto or flow against the apex of the deflector or baffle 15, and flow down the sides of the deflector to the apertures 17, the moisture then flowing downwardly through said apertures into the chamber 16, and the moisture which is not taken up by the air runs down the sloping sides of the hopper bottom of the drum and through the central opening or aperture 12 of said bottom. When the valve 19 is opened, air will be sucked through the tube 11 into the intake manifold of the engine, due to the suction created by the pistons, the air flowing upwardly through the aperture 12 into the chamber 16 thence radially to and up, through the apertures 17, and thence inwardly to the apices of the deflector 15 and partition 18, thence upwardly through the apertures 18' into the chamber 13 from which the air flows into the tube 11. The air therefore flows on an irregular line from the aperture 12 into the chamber 13 and in a direction directly opposite to the flow of moisture from the tube 14 to the aperture 12, in order that the moisture will be taken up by the air and carried with it into the tube 11 and engine cylinders whereby the desired results are obtained. Due to the fact that the tube 14 discharges below the partition or baffle 18 and that the tube 11 communicates with the drum above said partition, the moisture laden air must pass upwardly through the apertures 18' after the air has been constrained to move in an irregular path in opposition to the flow of moisture by gravity from the tube 14 to the aperture 12. This provides for the thorough mixture of the moisture and air, in order that the moisture will be carried with the air to the engine.

What is claimed is:—

A device of the character described embodying a casing having a hopper-shaped bottom provided with a central air inlet and moisture outlet, a conical deflector within the casing above the bottom thereof and having apertures near the walls of the casing, a conical partition within the casing above said deflector providing an air chamber between said partition and top of the casing, the casing having an air outlet above said partition communicating with said air chamber, and a liquid supply tube extending downwardly through the apex of the partition, said partition having apertures adjacent to its apex.

In testimony that I claim the foregoing as my own, I have hereto affixed my signature in the presence of two witnesses.

SAMUEL E. REID.

Witnesses:
R. CARL MONTGOMERY,
J. B. WALKER.